United States Patent
Nakamura et al.

(10) Patent No.: US 6,550,985 B2
(45) Date of Patent: Apr. 22, 2003

(54) METHOD OF SPLICING TWO OPTICAL FIBERS

(75) Inventors: Motonori Nakamura, Yokohama (JP); Yuichi Ohga, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/845,495

(22) Filed: May 1, 2001

(65) Prior Publication Data

US 2001/0041037 A1 Nov. 15, 2001

(30) Foreign Application Priority Data

May 9, 2000 (JP) ........................................ 2000-136271

(51) Int. Cl.$^7$ ............................................. G02B 6/255
(52) U.S. Cl. ............................................................ 385/96
(58) Field of Search ................................ 385/95, 96, 97

(56) References Cited

U.S. PATENT DOCUMENTS

| | | | | |
|---|---|---|---|---|
| 4,957,343 A | * | 9/1990 | Sato et al. ............... | 350/96.21 |
| 5,809,189 A | * | 9/1998 | Murphy et al. ............... | 385/43 |
| 5,939,136 A | * | 8/1999 | Cronk et al. ............. | 427/163.2 |
| 6,220,060 B1 | * | 4/2001 | Wisk et al. .................... | 65/435 |

FOREIGN PATENT DOCUMENTS

JP          2693649          9/1997

* cited by examiner

*Primary Examiner*—Lynn D. Feild
*Assistant Examiner*—Javaid Nasri
(74) *Attorney, Agent, or Firm*—McDermott, Will & Emery

(57) ABSTRACT

Two optical fibers to be spliced are prepared, coatings of resin are removed from end portions of the respective optical fibers to expose glass fibers, the glass fibers are aligned to each other, an a fusion step is carried out to heat the end faces of the glass fibers to cause fusion thereof to form a fusion-spliced portion. After that, an additive-diffusing step is carried out to diffuse an additive added in the glass fibers around the fusion-spiced portion, by a heat treatment around the fusion-spliced portion, by a heat treatment around the fusion-spliced portion at a first temperature of not less than 800° C. nor more than 1500° C. Further after the additive-diffusing step, a thermal-strain-removing step is carried out to remove thermal strain by a heat treatment of a wider region than heated regions in the fusion splice step and in the additive-diffusing step of the fusion-spliced portion, at a temperature of not less than 500° C. nor more than 1200° C.

7 Claims, 5 Drawing Sheets

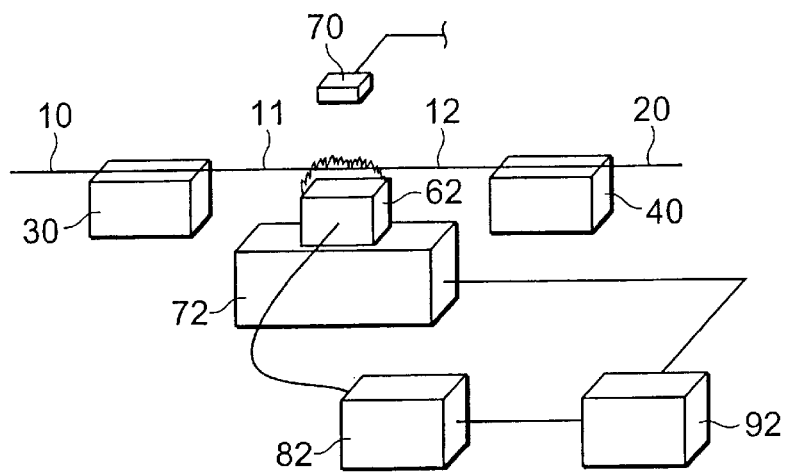
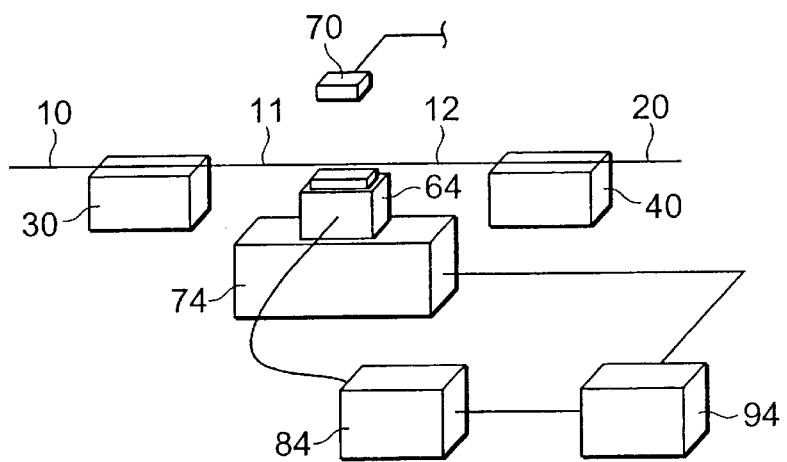
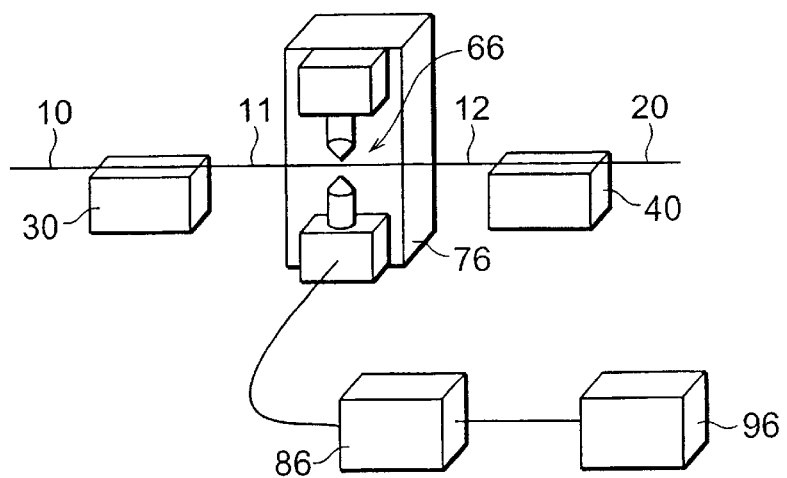

METHOD OF SPLICING TWO OPTICAL FIBERS

BACKGROUND OF THE INVENTION

1. Field of the Invention

The present invention relates to an optical fiber apparatus having a fusion-spliced portion in which two optical fibers are fusion-spliced, and a fabrication method thereof.

2. Related Background Art

As methods of cascade connection between two optical fibers, there are connector splice and fusion splice. Among these, the fusion splice is a method of aligning two optical fibers each other and heating end faces of the respective fibers to cause fusion thereof, and has the advantage of low splice loss. When two optical fibers of mutually different mode field diameters are spliced by fusion splice, the splice loss increases because of the difference between the mode field diameters. The splice loss can be reduced based on decrease in the difference between the mode field diameters by diffusion of an additive (for example, Ge or F) by heating at a predetermined temperature after the fusion splice. On the other hand, however, the fusion splice had the problem that the mechanical strength of the fusion-spliced portion was lower than that of the other portions of the optical fibers. Conventionally, in order to reinforce the fusion-spliced portion in the optical fiber apparatus including it, a steel wire was placed along the fusion-spliced portion and the whole of these were coated with resin.

SUMMARY OF THE INVENTION

The reinforcing method of the fusion-spliced portion with the steel wire as described above, however, has the following problems. Namely, the outside diameter of the reinforced portion (the portion along with the steel wire) including the fusion-spliced portion becomes larger than that of the other portions of the optical fibers. With increase in the outside diameter of the reinforced portion along with the steel wire, stress will be exerted on the optical fibers around this reinforced portion during the procedure of forming a cable from the two optical fibers spliced in cascade connection including this reinforced portion, during the procedure of forming a module by winding the fibers around a bobbin, or during other mounting procedures, so that it will raise the risk of fracture of the optical fibers or increase loss of light propagating in the optical fibers. It also becomes harder to bend this reinforced portion during the procedure of winding the two optical fibers including the reinforced portion around the bobbin. For the optical fiber apparatus having the fusion-spliced portion, as described, it is sometimes undesirable to employ the reinforcement of the fusion-spliced portion with the steel wire, depending upon mounting forms or uses.

The present invention has been accomplished to solve the above problems and an object of the present invention is thus to provide optical fiber apparatus that secures the sufficient mechanical strength of the fusion-spliced portion without use of the reinforcement with the steel wire, and a method of fabricating the optical fiber apparatus.

A fabrication method of optical fiber apparatus according to the present invention is a method of fabricating optical fiber apparatus having a fusion-spliced portion in which respective end faces of two optical fibers are spliced each other by fusion splice, which comprises a fusion step of heating the end faces of the two optical fibers to cause fusion thereof, thereby forming the fusion-spliced portion, an additive-diffusing step of diffusing an additive added in the two optical fibers, by a heating treatment of the fusion-spliced portion at a first temperature of not less than 800° C. nor more than 1500° C., and a thermal-strain-removing step of removing thermal strain by a heating treatment of a wider region than heated regions in the fusion step and in the additive-diffusing step of the fusion-spliced portion, at a second temperature being not less than 500° C. nor more than 1200° C. and being lower than the first temperature, after the additive-diffusing step.

According to this fabrication method of optical fiber apparatus, in the fusion step the end faces of the two optical fibers are heated to cause the fusion thereof to form the fusion-spliced portion and in the additive-diffusing step thereafter the fusion-spliced portion is subjected to the heating treatment at the first temperature of not less than 800° C. nor more than 1500° C. to diffuse the additive added in the two optical fibers near the fusion-spliced portion. In the thermal-strain-removing step after the additive-diffusing step, the thermal strain is removed in and around the fusion-spliced portion by the heating treatment of the wider region than the heated regions in the fusion step and in the additive-diffusing step of the fusion-spliced portion, at the second temperature being not less than 500° C. nor more than 1200° C. and being lower than the first temperature, and thereafter the region is cooled.

Even in the case of two optical fibers of mutually different mode field diameters being spliced each other by fusion splice, the splice loss can be reduced based on decrease in the difference between the mode field diameters, by diffusing the additive by the heating treatment at the first temperature in the additive-diffusing step. The thermal strain appears near the fusion-spliced portion in the fusion step and in the additive-diffusing step, but this thermal strain is removed in the thermal-strain-removing step of heating the wider region than the heated regions in the fusion step and in the additive-diffusing step of the fusion-spliced portion, at the second temperature being not less than 500° C. nor more than 1200° C. and being lower than the first temperature, whereby the sufficient mechanical strength is ensured in and around the fusion-spliced portion of optical fiber apparatus. Here the "heated region" stated in the present invention means a region in which the temperature becomes 500° C. and higher during heating of the optical fibers. The removed state of thermal strain is also maintained during the cooling after the thermal-strain-removing step, so that the satisfactory mechanical strength is ensured in and around the fusion-spliced portion of optical fiber apparatus. The cooling rate is preferably not more than 4000° C./min.

The fabrication method of optical fiber apparatus according to the present invention is characterized in that in the thermal-strain-removing step the heating treatment is carried out by arc discharge, by flame generated with supply of inflammable gas and oxygen gas to a burner, or by a heater. In either of these cases, the thermal-strain-removing step is carried out to perform the heating treatment in and around the fusion-spliced portion of optical fiber apparatus at the appropriate temperature, so as to remove the thermal strain caused in the fusion step. The heating by arc discharge is preferred, because a fusion splicing machine can be used as it is. The heating by the burner is preferred, because it permits distribution heating in and around the fusion-spliced portion of optical fiber apparatus and use of a compact heating device. The heating by the heater is preferred, because it permits the distribution heating in and around the fusion-spliced portion of optical fiber apparatus and keeps a heating atmosphere clean.

The fabrication method of optical fiber apparatus according to the present invention is characterized in that in the thermal-strain-removing step the above heating treatment is carried out while moving a heat source relative to the two optical fibers along the longitudinal direction thereof. In this case, the thermal strain in the heated range during the additive-diffusing step can be properly removed in the thermal-strain-removing step.

The fabrication method of optical fiber apparatus according to the present invention is characterized in that in the thermal-strain-removing step a temperature gradient along the longitudinal direction of the two optical fibers is not more than 500° C./mm. In this case, since the temperature gradient is small, the thermal strain is adequately removed.

An optical fiber apparatus according to the present invention is characterized by being fabricated by the aforementioned fabrication method of optical fiber apparatus according to the present invention. Since the thermal strain caused in the fusion step is removed from the optical fiber apparatus in the thermal-strain-removing step, the satisfactory mechanical strength is ensured in and around the fusion-spliced portion without use of the reinforcement with the steel wire. Even in the case of optical fiber apparatus in which two optical fibers of mutually different mode field diameters are spliced each other by fusion splice, since the additive is diffused by the heating treatment at the first temperature in the additive-diffusing step, the difference is small between the mode field diameters and the splice loss is thus small.

The optical fiber apparatus stated herein means one having the fusion-spliced portion in which two or more optical fibers are spliced each other by fusion splice, and involves optical fiber transmission lines to be laid (e.g., a dispersion compensating optical fiber+a single-mode optical fiber), modules on bobbins (e.g., a dispersion compensating optical fiber+a single-mode optical fiber, and an Er-doped optical fiber for optical amplification+a single-mode optical fiber), and other forms.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 3 is a perspective view to show a heating system provided with a burner;

FIG. 4 is a perspective view to show a heating system provided with a heater;

FIG. 5 is a perspective view to show a heating system provided with a discharge section for arc discharge;

DESCRIPTION OF THE PREFERRED EMBODIMENTS

The preferred embodiments of the present invention will be described hereinafter in detail with reference to the accompanying drawings. It is noted that in the description of the drawings the same elements will be denoted by the same reference symbols and redundant description will be omitted.

First described is how the inventors accomplished the present invention. The inventors researched the reason why the mechanical strength of the fusion-spliced portion was lower than that of the other portions of the optical fibers in the optical fiber apparatus having the fusion-spliced portion, and found that the cause was the thermal strain due to the local heating at high temperature only at and in the close vicinity of the end faces of the two optical fibers during the fusion step and during the diffusion step of additive. Describing in more detail, there occurs the thermal strain in the fusion-spliced portion during the fusion procedure of heating the glass end faces of the respective optical fibers to the temperature at which glass is adequately softened, or the thermal strain appears in the fusion-spliced portion during the heating to the temperature for sufficient diffusion of the additive, and the thermal strain remains during cooling of the optical fibers thereafter. We can observe the thermal strain remaining in this fusion-spliced portion with an interference microscope or the like. The thermal strain is greatest at the both ends of the heated region of the fusion-spliced portion. If the thermal strain is left in the fusion-spliced portion, the fusion-spliced portion can break during a post-step, so as to lower the fabrication yield of optical fiber apparatus. In this case the optical fiber apparatus is most fragile at the both ends of the heated region during the fusion splice. The present invention has been accomplished based on the above knowledge and involves the removal of thermal strain by the heating treatment of heating the region in and around the fusion-spliced portion at the appropriate temperature after the fusion, thereby ensuring the sufficient mechanical strength of the fusion-spliced portion of optical fiber apparatus.

Figure 1A:
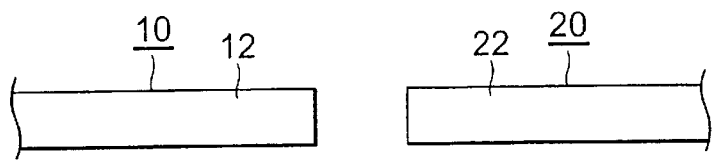
FIG. 1A to FIG. 1G are step diagrams to illustrate a fabrication method of optical fiber apparatus according to the present invention.
Figure 1B:
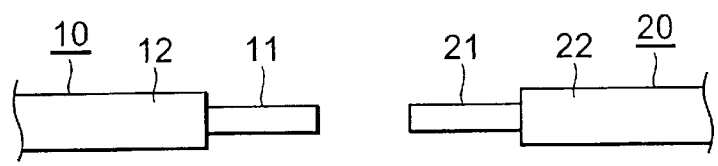
Figure 1C:
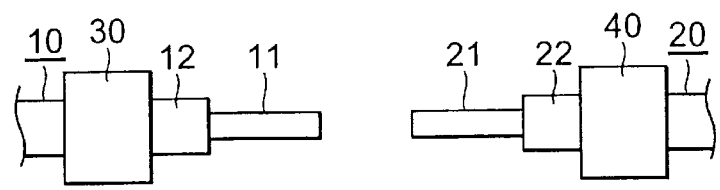

In the next place, the steps in the fabrication method of optical fiber apparatus according to the present embodiment will be described. FIG. 1A to FIG. 1G are the step diagrams to illustrate the fabrication method of optical fiber apparatus according to the present embodiment. In the first step, two optical fibers 10 and 20 to be spliced each other are prepared (FIG. 1A). The optical fibers 10, 20 are those formed by coating the periphery of silica-glass-based glass fibers 11, 21 with resin 12, 22. Then the coatings of resin 12, 22 are removed from the end portions of the respective optical fibers 10, 20, thereby exposing the glass fibers 11, 21 in the end portions (FIG. 1B). The removal of the coatings of resin 12, 22 is chemically carried out, for example, with hot concentrated sulfuric acid and thereafter, the sulfuric acid is washed away with water or acetone. Then end portions of the glass fibers 11, 21 are cut by a fiber cutter, these optical fibers 10, 20 after the removal of the coatings from their end portions are held by fiber holders 30, 40 of a fusion splicer, and the glass fibers 11, 21 are aligned each other (FIG. 1C).

Figure 1D:
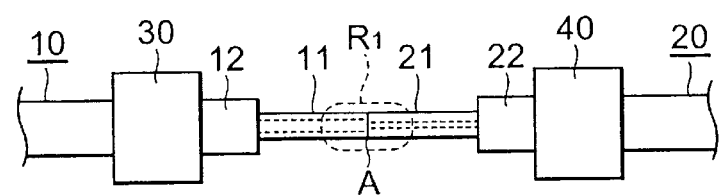

After the alignment, the fusion step is carried out to heat the end faces of the glass fibers 11, 21 to cause fusion thereof to form the fusion-spliced portion A (FIG. 1D). Specifically, the end faces of the glass fibers 11, 21 are preheated and shaped, the end faces of the glass fibers 11, 21 are pressed against each other to be spliced, and the glass fibers are shaped and heated around the fusion-spliced portion A. A region $R_1$ surrounded by a dashed line in the figure represents the heated region in this fusion step. The heated region is a region in which the temperature becomes 500° C. and higher. In the fusion procedure, the temperature at the both ends of the heated region $R_1$ is lower than the temperature of the fiber spliced portion in the center, so that the thermal strain is large near the both ends of the heated region in the glass fibers 11, 21, so as to make the fibers easy to break there.

Figure 1E:
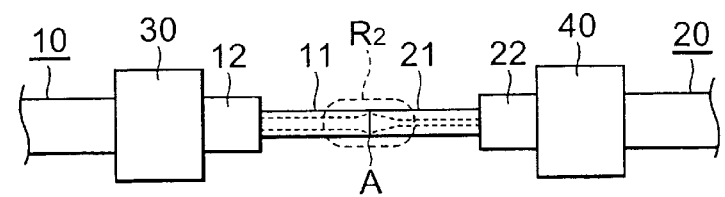

After the fusion step, the additive-diffusing step is carried out to heat the region in and around the fusion-spliced portion A at the first temperature of not less than 800° C. nor more than 1500° C. to diffuse the additive added in the glass fibers 11, 21 in and around the fusion-spliced portion A (FIG. 1E). A region $R_2$ surrounded by a dashed line in the figure represents the heated region in this additive-diffusing step. The heating temperature range of 800° C. to 1500° C. in the additive-diffusing step is not more than the softening temperature of the glass fibers 11, 21 and is sufficient to diffuse the additive added in the glass fibers 11, 21. A heating period in the additive-diffusing step is preferably not less than about two minutes nor more than about ten minutes. The higher the heating temperature, the shorter the heating period. When the additive is diffused by the heating treatment in the additive-diffusing step, the difference becomes smaller between the mode field diameters and the splice loss is thus reduced. In the additive-diffusing step the heated region is preferably wider than the heated region during the fusion step.

Figure 1F:
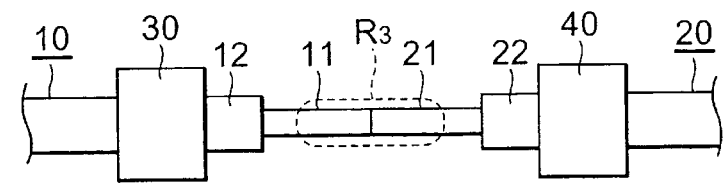

After the additive-diffusing step, the thermal-strain-removing step is carried out to remove the thermal strain by a heating treatment of a wider region $R_3$ than the heated region $R_1$ and the heated region $R_2$ in and around the fusion-spliced portion A, at the second temperature being not less than 500° C. nor more than 1200° C. and being lower than the first temperature (FIG. 1F). In other words, the region of temperature of 500° C. and higher in the thermal-strain-removing step is wider than those in the fusion step and during the heating of the additive-diffusing region. The heated region is preferably set wider than the heated region in the additive-diffusing step. The heating temperature range of 500° C. to 1200° C. in the thermal-strain-removing step is not more than the softening temperature of the glass fibers 11, 21 and is sufficient to remove the thermal strain. A heating period in the thermal-strain-removing step is shorter than the heating period in the additive-diffusing step and a sufficient heating period is as short as about several seconds to about several ten seconds. The heating treatment in the thermal-strain-removing step removes the thermal strain caused around the fusion-spliced portion A in the fusion step or in the additive-diffusing step and restores the mechanical strength around the fusion-spliced portion A. In each of FIGS. 1D and 1E, a longitudinal change of the mode field diameters in the glass fibers 11, 21 is schematically shown by dashed lines.

In the thermal-strain-removing step, it is preferable to perform the heating treatment in and around the fusion-spliced portion while moving the heat source relative to the glass fibers 11, 21 along the longitudinal direction thereof, whereby the thermal strain caused in the heated region in the additive-diffusing step can be removed by the thermal-strain-removing step. Namely, in order to reduce radiative loss due to the longitudinal change of the mode field diameters, it is necessary to make the longitudinal change of the mode field diameters gentler. Moreover, since the first temperature in the additive-diffusing step is relatively high, the heated region in the additive-diffusing step (i.e., the range suffering the thermal strain) is relatively wide (e.g., approximately 10 mm to 15 mm). In contrast with it, since the second temperature in the thermal-strain-removing step is relatively low, the heated range in the thermal-strain-removing step is relatively narrow (e.g., approximately 5 mm to 10 mm) if the heat source is fixed. It is thus preferable to perform the heating treatment in and around the fusion-spliced portion while moving the heat source relative to the two optical fibers along the longitudinal direction thereof in the thermal-strain-removing step. In the thermal-strain-removing step the temperature gradient along the longitudinal direction of the two optical fibers is preferably not more than 500° C./mm and the thermal strain can be adequately removed by adopting such a small temperature gradient.

Figure 1G:
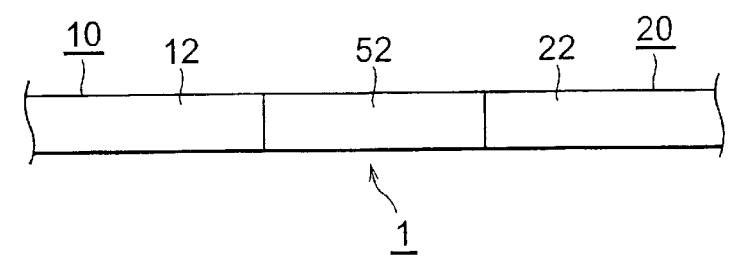

Then the region in and around the fusion-spliced portion A is cooled after the thermal-strain-removing step. A cooling rate in this cooling step is preferably not more than 4000° C./min. After the cooling, the glass fibers 11, 21 exposed are again coated with resin 52 (FIG. 1G). The outside diameter of this coating of resin 52 is approximately equal to that of the coatings of resin 12, 22 of the optical fibers 10, 20. After that, predetermined mounting procedures, e.g. a procedure of winding the optical fibers 10, 20 including the fusion-spliced portion A around a bobbin, are carried out, thereby fabricating an optical fiber apparatus 1. The optical fiber apparatus 1 fabricated in this way has sufficient mechanical strength in and around the fusion-spliced portion A without use of the reinforcement with the steel wire, because the thermal strain caused during the fusion step is removed in the thermal-strain-removing step. Even if the optical fiber apparatus is one in which two optical fibers of mutually different mode field diameters are spliced each other by fusion splice, the difference is small between the mode field diameters and the splice loss is small, because the additive is diffused by the heating treatment at the first temperature in the additive-diffusing step.

Figure 2:
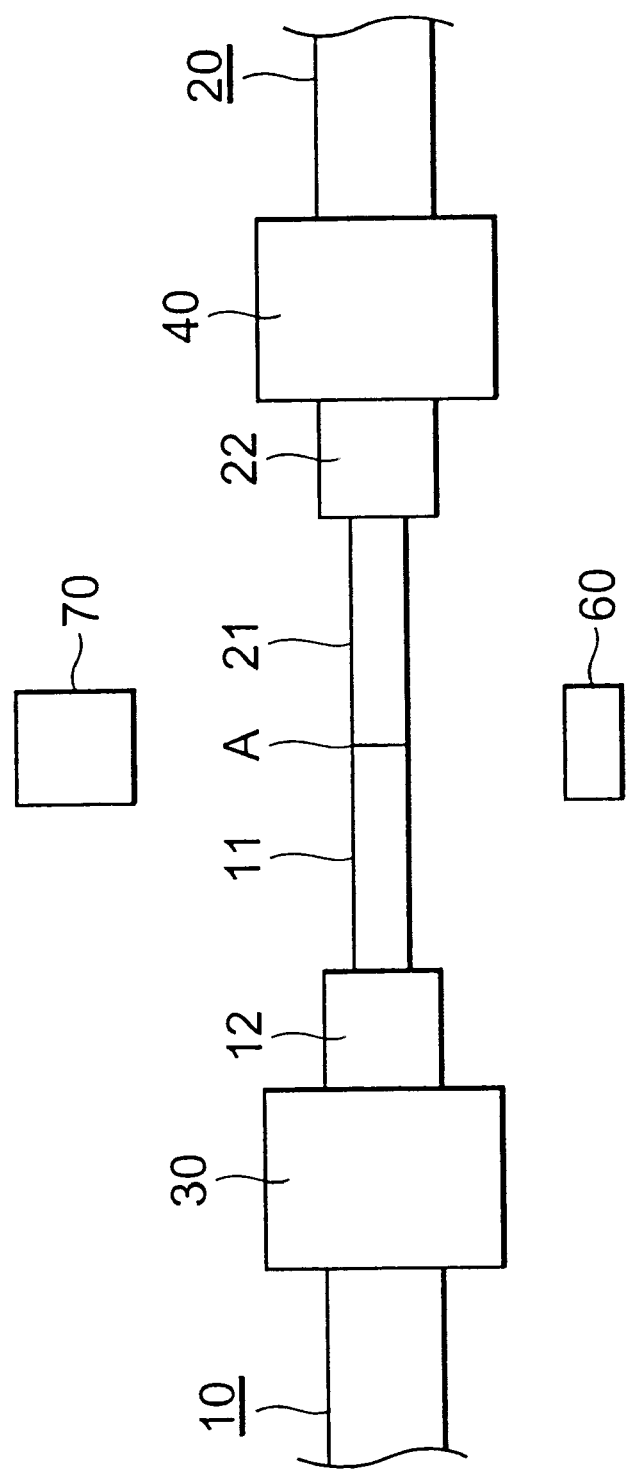
FIG. 2 is a block diagram of a system for carrying out the thermal-strain-removing step in the fabrication method of optical fiber apparatus according to the present invention.

FIG. 2 is a block diagram of a system for carrying out the thermal-strain-removing step in the fabrication method of optical fiber apparatus according to the present embodiment. As illustrated in this figure, the system is provided with a heat source 60 for heating the region in and around the fusion-spliced portion A and a radiation thermometer 70 for measuring the temperature in and around the fusion-spliced portion A, which are placed near the fusion-spliced portion A. The temperature in and around the fusion-spliced portion A is measured by the radiation thermometer 70, and the heating in and around the fusion-spliced portion A by the heat source 60 is controlled so that the temperature measured by the radiation thermometer 70 becomes an adequate value.

The heat source 60 is electrodes for arc discharge, a burner, or a heater (an electric heater, a ceramic heater, or the like), and can be reciprocally moved along the longitudinal direction of the glass fibers 11, 21.

FIG. 3 shows a heating system using a burner. This heating system is provided with a burner 62, a driving device 72 for reciprocally moving the burner 62 along the axial direction of the fibers, a gas supply unit 82 for supplying gas to the burner 62, and a control unit 92 for controlling a gas supply amount of the gas supply unit 82 and a driving distance of the driving unit 72, based on the temperature information from the radiation thermometer 70. The optical fibers 10, 20 with the glass fibers 11, 21 being spliced are held by fiber holders 30, 40.

The radiation thermometer 70 is a combination of a two-dimensional infrared radiation thermometer with a magnifying lens, and measures a temperature distribution in and around the fusion-spliced portion A through the magnifying lens by the two-dimensional infrared radiation thermometer. The emissivity is set to 0.5 in consideration of the shape and material of the glass fibers 11, 21 as a measured object. In the thermal-strain-removing step, the heat source 60 is placed or moved along the axial direction of the fibers so that the temperature distribution measured by this radiation thermometer 70 satisfies the aforementioned relation between the heated region $R_1$ and the heated region $R_2$.

Upon activation of this system in this structure, flame is generated with supply of inflammable gas (hydrocarbon gas, e.g., propane gas) and oxygen gas from the gas supply unit 82 to the burner 62, so as to be able to carry out the heating treatment to heat the region in and around the fusion-spliced portion A by this flame. The use of the burner 62 as the heat source 60 is preferred, because it permits the distribution heating in and around the fusion-spliced portion A and the use of the compact heating unit.

FIG. 4 shows a heating system using a heater. This heating system is provided with a heater 64, a driving unit 74 for reciprocally moving the heater 64 along the axial direction of the fibers, a power supply unit 84 for supplying power to the heater 64, and a control unit 94 for controlling a power supply amount of the power supply unit 84 and a driving distance of the driving unit 74, based on the temperature information from the radiation thermometer 70.

Upon activation of the system in this structure, the power supply unit 84 supplies the power to the heater 64 to heat the heater up, thereby implementing the heating treatment of the region in and around the fusion-spliced portion A. The use of the heater 64 as the heat source 60 is preferred, because it permits the distribution heating in and around the fusion-spliced portion A and keeps the heating atmosphere clean.

FIG. 5 shows a heating system of an arc discharge type. This heating system is provided with a discharge section 66 consisting of a pair of electrodes opposed to each other, a driving unit 76 for reciprocally moving the discharge section 66 along the axial direction of the fibers, a power supply unit 86 for supplying power to the discharge section 66, and a control unit 96 for controlling a power supply amount of the power supply unit 86 and a driving distance of the driving unit 76, based on the temperature information from the radiation thermometer.

Upon activation of the system in this structure, the power supply unit 86 supplies the power to the discharge section 66 to induce arc discharge, thereby implementing the heating treatment in and around the fusion-spliced portion A. The use of the discharge section 66 as the heat source 60 is preferred, because the fusion splicer can be used as it is.

In the next place, specific examples of the fabrication method of optical fiber apparatus according to the present embodiment will be described. In Examples 1 to 5 below, a silica-glass-based single-mode optical fiber (the mode field diameter 10 μm) having positive chromatic dispersion at the wavelength of 1.55 μm was used as the optical fiber 10, and a silica-glass-based dispersion compensating optical fiber (the mode field diameter 5 μm) having negative chromatic dispersion at the wavelength of 1.55 μm as the optical fiber 20.

In the first example, arc discharge was used in each of the additive-diffusing step and the thermal-strain-removing step. Specifically, the end faces of the glass fibers 11, 21 were spliced each other by the arc discharge, using the fusion splicer, and in the additive-diffusing step and in the thermal-strain-removing step thereafter the fusion splicer was also used as it was. In the additive-diffusing step, the arc discharge current was 15 mA, the heating temperature was 1300° C., and twenty cycles, each cycle consisting of a heating period of ten seconds and a rest period of sixty seconds, were repeatedly carried out. In the thermal-strain-removing step, the arc discharge current was 10 mA, the heating temperature 800° C., and the heating period 10 seconds. In the thermal-strain-removing step, the thermal strain was removed by heating the wider range than the heated regions during the fusion splice and during the diffusion of additive in and around the fusion-spliced portion while moving the arc discharge electrodes along the longitudinal direction around the fusion-spliced portion. Twenty optical fiber apparatus having the fusion-spliced portion were fabricated in this way. The average splice loss of the twenty optical fiber apparatus was 0.12 dB and the average rupture strength was 29.4 N (3.0 kg), thus meeting with good results. Another set of twenty optical fibers having the fusion-spliced portion were also fabricated in the same manner as above except that the thermal-strain-removing step was not carried out. The average splice loss of them was 0.11 dB and the average rupture strength 16.66 N (1.7 kg). The above results verified that execution of the thermal-strain-removing step as described led to improvement in the rupture strength.

In the second example, a compact burner was used in each of the additive-diffusing step and the thermal-strain-removing step. Specifically, the end faces of the glass fibers 11, 21 were spliced each other by the arc discharge, using the fusion splicer, and in the additive-diffusing step and in the thermal-strain-removing step thereafter, the wider region in and around the fusion-spliced portion than the heated region during the fusion splice was heated with the burner in another heating device. The heated region in the thermal-strain-removing step was also set wider than the heated region in the additive-diffusing step. Propane gas and oxygen gas was supplied to the burner. In the additive-diffusing step, the supply amount of propane gas was 30 cc/min, the supply amount of oxygen gas 55 cc/min, the heating temperature 1100° C., and ten cycles, each cycle consisting of a heating period of 20 seconds and a rest period of 5 seconds, were repeatedly carried out. In the thermal-strain-removing step, the supply amount of propane gas was 20 cc/min, the supply amount of oxygen gas 30 cc/min, the heating temperature 800° C., and the heating period 20 seconds. In the thermal-strain-removing step the thermal strain was removed by heating the region in and around the fusion-spliced portion while moving the burner along the longitudinal direction around the fusion-spliced portion. Twenty optical fiber apparatus having the fusion-spliced portion were fabricated in this way. The average splice loss of the twenty optical fiber apparatus was 0.12 dB and the average rupture strength 29.4 N (3.0 kg), thus meeting with the good results. Another set of twenty optical fiber apparatus having the fusion-spliced portion were also fabricated in the same manner as above except that the thermal-strain-removing step was not carried out. The average splice loss of them was 0.12 dB and the average rupture strength 17.64 N (1.8 kg). These results verified that execution of the thermal-strain-removing step led to improvement in the rupture strength.

In the third example, an electric heater was used in each of the additive-diffusing step and the thermal-strainremoving step. Specifically, the end faces of the glass fibers 11, 21 were spliced each other by arc discharge, using the fusion splicer, and in the additive-diffusing step and in the thermal-strain-removing step thereafter, the wider range in and around the fusion-spliced portion than the heated region during the fusion splice was heated by the electric heater in another heating device. The heated region in the thermal-strain-removing step was also set wider than the heated region in the additive-diffusing step. At this time, the electrode portion of the electric heater was purged with Ar gas. In the additive-diffusing step, the current supplied to the electric heater was 3 A, the heating temperature 1100° C., and the heating period 10 minutes. In the thermal-strain-removing step, the current supplied to the electric heater was 1.5 A, the heating temperature 600° C., and the heating period one minute. In the thermal-strain-removing step, the thermal strain was removed by heating the region in and around the fusion-spliced portion while moving the electric heater along the longitudinal direction around the fusion-spliced portion. Twenty optical fiber apparatus having the fusion-spliced portion were fabricated in this way. The average splice loss of the twenty optical fiber apparatus was 0.13 dB and the average rupture strength 27.44 N (2.8 kg), thus meeting with good results. Another set of twenty optical fiber apparatus having the fusion-spliced portion were also fabricated in the same manner as above except that the thermal-strain-removing step was not carried out. The average splice loss of them was 0.13 dB and the average rupture strength 16.66 N (1.7 kg). These results verified that execution of the thermal-strain-removing step led to improvement in the rupture strength.

In the fourth example, a compact burner was used in each of the additive-diffusing step and the thermal-strain-removing step. Specifically, the end faces of the glass fibers 11, 21 were spliced each other by arc discharge, using the fusion splicer, and in the additive-diffusing step and in the thermal-strain-removing step thereafter, the wider region in and around the fusion-spliced portion than the heated region during the fusion splice was heated by the burner in another heating device. The heated region in the thermal-strain-removing step was also set wider than the heated region in the additive-diffusing step. Propane gas and oxygen gas was supplied to the burner. The heating period in the additive-diffusing step was 300 seconds and the heating period in the thermal-strain-removing step was 15 seconds. Twenty optical fiber apparatus having the fusion-spliced portion were fabricated under each of temperature conditions in the additive-diffusing step and under each of temperature conditions in the thermal-strain-removing step and the tensile rupture test was conducted for each of twenty optical fiber apparatus to find 50% rupture strength, which was the strength at which 50% optical fiber apparatus, i.e., ten optical fiber apparatus broke.

Figure 6:
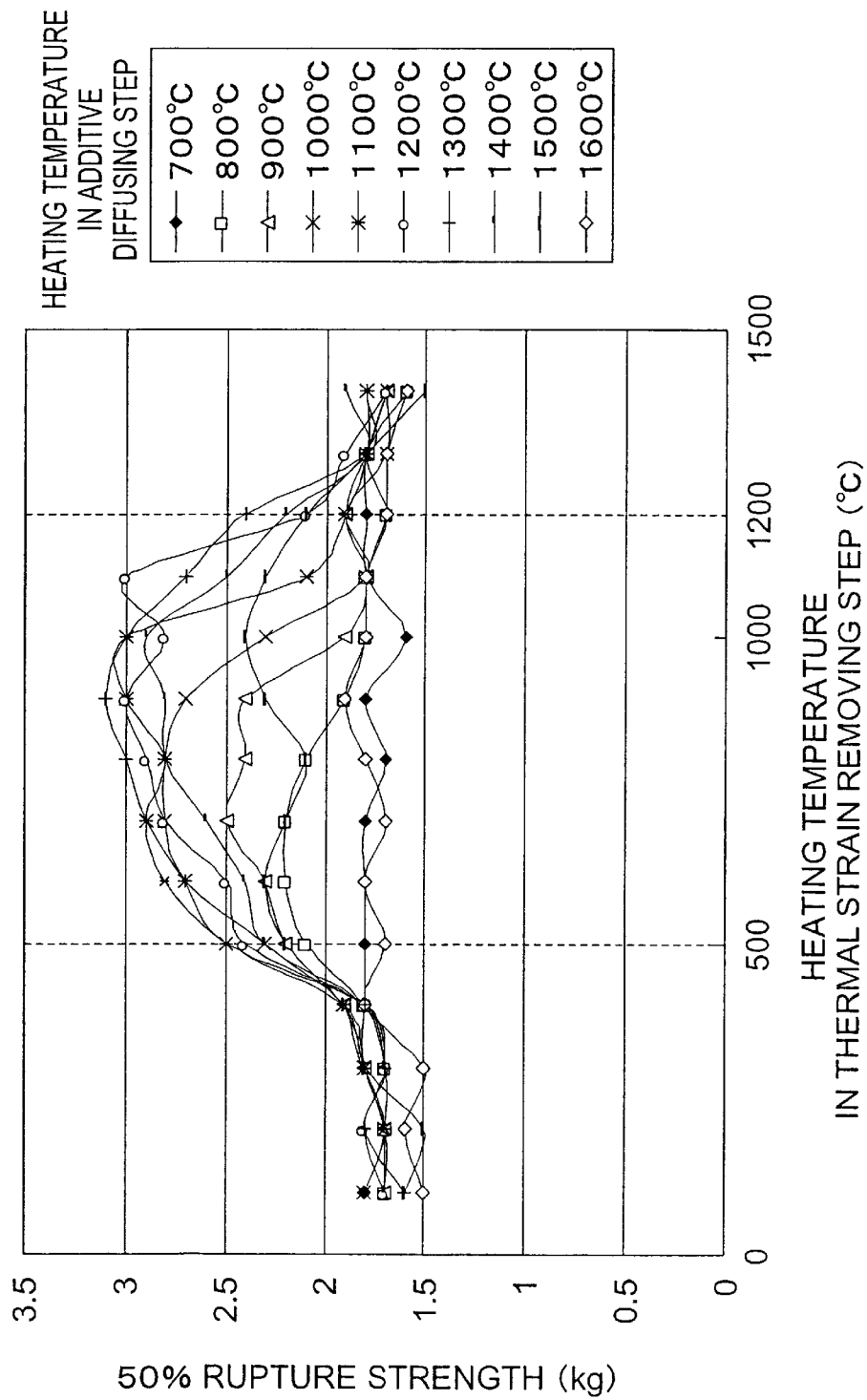
FIG. 6 is a graph to show the relation between 50% rupture strength and heating temperature in the thermal-strain-removing step, at each of heating temperatures during the additive-diffusing step.

FIG. 6 is a graph to show the relation between 50% rupture strength and heating temperature in the thermal-strain-removing step, for each of heating temperatures in the additive-diffusing step. As apparent from this graph, the 50% rupture strength was not less than 19.6 N (2.0 kg) and thus sufficient mechanical strength was able to be ensured for the fusion-spliced portion of the optical fiber apparatus if the heating temperature in the additive-diffusing step was in the range of not less than 800° C. nor more than 1500° C. and if the heating temperature in the thermal-strain-removing step was in the range of not less than 500° C. nor more than 1200° C. It was also confirmed that the splice loss was not more than 0.15 dB if the heating temperature in the additive-diffusing step was in the range of not less than 700° C. nor more than 1600° C. and if the heating temperature in the thermal-strain-removing step was in the range of not less than 100° C. nor more than 1400° C. Similar results were also obtained in either of the cases using the arc discharge, the burner, and the heater as the heat source.

In the fifth example, a compact burner was used in each of the additive-diffusing step and the thermal-strain-removing step. In this example, the heating temperature was 900° C. and the heating period 400 seconds in the additive-diffusing step. The heating period was 20 seconds in the thermal-strain-removing step. Twenty optical fiber apparatus having the fusion-spliced portion were fabricated at each of various temperature gradients along the longitudinal direction of the glass fibers 11, 21 in the thermal-strain-removing step. Then the tensile rupture test was conducted for each of twenty optical fiber apparatus.

Figure 7:
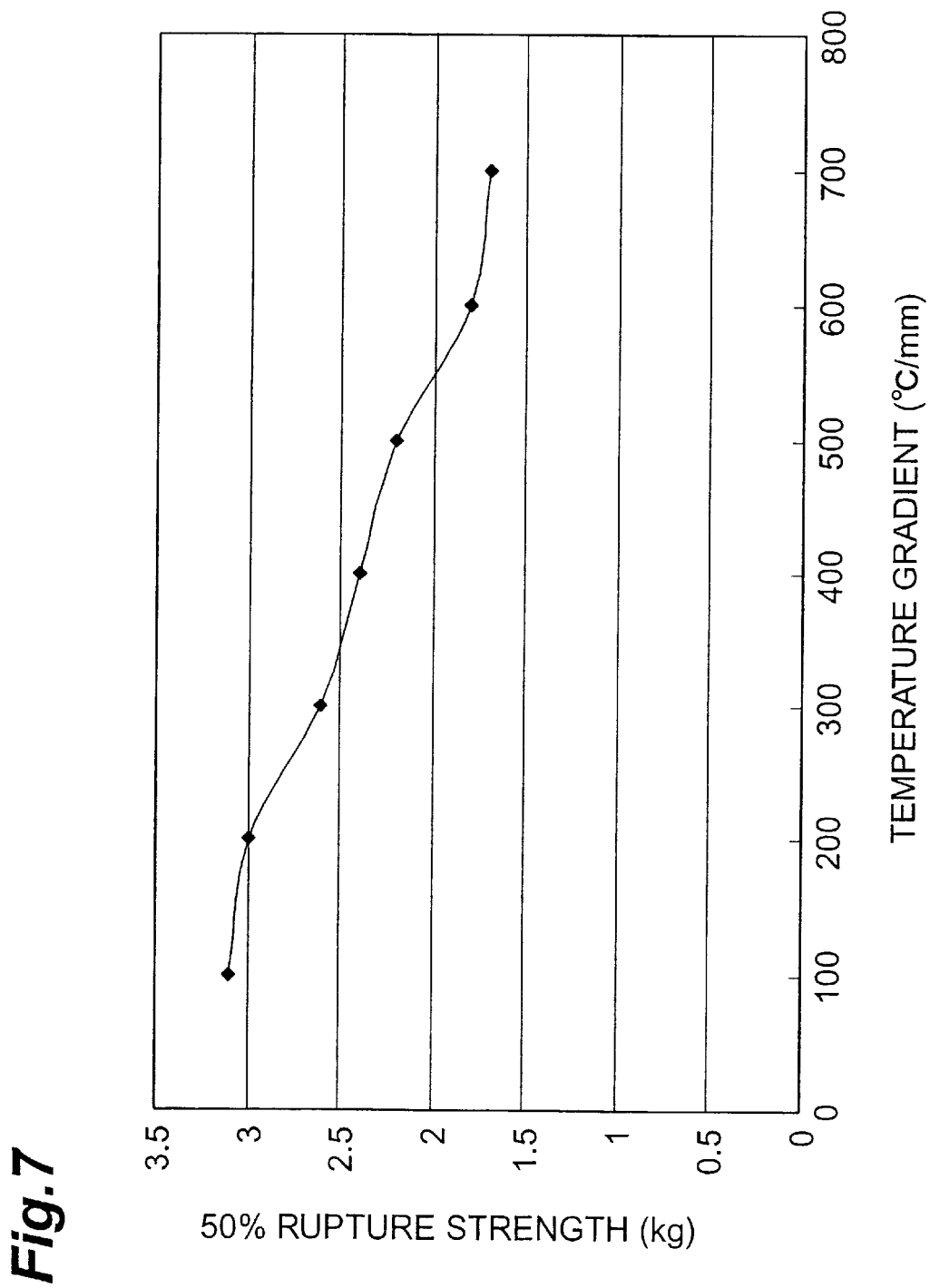
FIG. 7 is a graph to show a relation between 50% rupture strength and temperature gradient in the thermal-strain-removing step.

FIG. 7 is a graph to show the relation between 50% rupture strength and temperature gradient in the thermal-strain-removing step. As seen from this graph, the 50% rupture strength was not less than 19.6 N (2.0 kg) if the temperature gradient was in the range of not more than 500° C./mm; the 50% rupture strength was not less than 24.5 N (2.5 kg) if the temperature gradient was in the range of not more than 300° C./mm; the 50% rupture strength was not less than 29.4 N (3.0 kg) if the temperature gradient was in the range of not more than 200° C./mm. Therefore, with decrease of temperature gradient, the sufficient mechanical strength was able to be ensured for the fusion-spliced portion of the optical fiber apparatus. It was also confirmed that the splice loss was not more than 0.15 dB under all the temperature gradient conditions. Similar results were also obtained in either of the cases using the arc discharge, the burner, and the heater as the heat source.

According to the fabrication method of optical fiber apparatus in the present embodiment, as described above, in the fusion step the end faces of the glass fibers 11, 21 are heated to cause the fusion thereof to form the fusion-spliced portion, and in the additive-diffusing step thereafter the heating treatment is carried out to heat the region in and around the fusion-spliced portion at the first temperature of not less than 800° C. nor more than 1500° C. to diffuse the additive added in the glass fibers 11, 21 in and around the fusion-spliced portion. In the thermal-strain-removing step after the additive-diffusing step, the thermal strain is removed by the heating treatment over the wider range than the heated regions during the fusion splice and during the diffusion of additive in and around the fusion-spliced portion, at the second temperature being not less than 500° C. nor more than 1200° C. and being lower than the first temperature.

Therefore, even if the optical fiber apparatus is formed by splicing the glass fibers 11, 21 of mutually different mode field diameters each other, the difference can be made smaller between the mode field diameters, so as to decrease the splice loss, by diffusing the additive by the heating treatment at the first temperature in the additive-diffusing step. The thermal strain appears in and around the fusion-spliced portion in the fusion step and in the additive-diffusing step, but the thermal strain is removed in the thermal-strain-removing step at the second temperature being not less than 500° C. nor more than 1200° C. and being lower than the first temperature, whereby the sufficient mechanical strength is ensured in and around the fusion-spliced portion of optical fiber apparatus. The examples confirmed that the average rupture strength of optical fiber apparatus was kept not less than 24.5 N (2.5 kg) by the thermal-strain-removing step.

As detailed above, the fabrication method of optical fiber apparatus according to the present invention comprises the fusion step of heating the end faces of two optical fibers to cause fusion thereof to form the fusion-spliced portion and the additive-diffusing step thereafter of diffusing the additive added in the two optical fibers in and around the fusion-spliced portion by the heating treatment in and around the fusion-spliced portion at the first temperature of not less than 800° C. nor more than 1500° C. Then the thermal-strain-removing step thereafter is further carried out to remove the thermal strain by the heating treatment of the region in and around the fusion-spliced portion (the wider range than the heated region during the fusion splice and the heated region during the diffusion of additive) at the second temperature being not less than 500° C. nor more than 1200° C. and being lower than the first temperature, followed by cooling. Accordingly, even if the optical fiber apparatus is made by splicing two optical fibers of mutually different mode field diameters each other, the difference can be made smaller between the mode field diameters, so as to decrease the splice loss, by diffusing the additive by the heating treatment at the first temperature in the additive-diffusing step. The thermal strain is caused in and around the fusion-spliced portion in the fusion step and in the additive-diffusing step, but this thermal strain is removed in the thermal-strain-removing step at the second temperature being not less than 500° C. nor more than 1200° C. and being lower than the first temperature, whereby the sufficient mechanical strength is ensured in and around the fusion-spliced portion of optical fiber apparatus. The removed state of thermal strain is also maintained during cooling thereafter, so that the sufficient mechanical strength is ensured for the region in and around the fusion-spliced portion of optical fiber apparatus.

As described above, the sufficient mechanical strength of the fusion-spliced portion is ensured without use of the reinforcement with the steel wire, in the optical fiber apparatus fabricated by the fabrication method of optical fiber apparatus according to the present invention. Therefore, the outside diameter of the fusion-spliced portion is not larger than that of the other portions of the optical fibers and thus the stress exerted on the optical fibers around the fusion-spliced portion is relieved during the procedure of forming a cable from the two optical fibers including the fusion-spliced portion, during a procedure of forming a module by winding the fibers around a bobbin, or during other mounting procedures. Further, the risk of fracture of optical fibers is reduced and increase is suppressed in loss of the light propagating in the optical fibers. In addition, the fusion-spliced portion can be readily bent when the two optical fibers including the fusion-spliced portion are wound around the bobbin. Even if the optical fiber apparatus is one made by fusion splice of two optical fibers of mutually different mode field diameters, the difference is small between the mode field diameters and the splice loss is small, because the additive is diffused by the heating treatment at the first temperature in the additive-diffusing step.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of fabricating an optical fiber apparatus having a fusion-spliced portion in which end faces of two optical fibers are spliced to each other by fusion splice, the method comprising:

a fusion step of heating the end faces of said two optical fibers to cause fusion thereof, thereby forming the fusion-spliced portion;

an additive-diffusing step of diffusing an additive added in said two optical fibers, by a heat treatment of said fusion-spliced portion at a first temperature of not less than 800° C. nor more than 1500° C.; and a thermal-strain-removing step of removing thermal strain by a heat treatment of a wider region than heated regions in said fusion step and in said additive-diffusing step of said fusion-spliced portion, at a second temperature being not less than 500° C. nor more than 1200° C. and said second temperature being selected to be lower than said first temperature.

2. The method according to claim 1, wherein in said thermal-strain-removing step said heating treatment is carried out by arc discharge.

3. The method according to claim 1, wherein in said thermal-strain-removing step said heating treatment is carried out by flame generated with supply of inflammable gas and oxygen gas to a burner.

4. The method according to claim 1, wherein in said thermal-strain-removing step said heating treatment is carried out by a heater.

5. The method according to claim 1, wherein in said thermal-strain-removing step said heating treatment is carried out while moving a heat source relative to said two optical fibers along the longitudinal direction thereof.

6. The method according to claim 1, wherein in said thermal-strain-removing step, a temperature gradient along a longitudinal direction of said two optical fibers is not more than 500° C./mm.

7. An optical fiber apparatus fabricated by the method as set forth in claim 1.

* * * * *